(12) United States Patent
Krichtafovitch et al.

(10) Patent No.: US 12,528,090 B2
(45) Date of Patent: Jan. 20, 2026

(54) SPARK TOLERANT ELECTROSTATIC PRECIPITATOR

(71) Applicant: AGENTIS AIR LLC, Columbia, MD (US)

(72) Inventors: Igor Krichtafovitch, Kiev (UA); Alan Viosca, Seattle, WA (US); Larry Rothenberg, Kensington, MD (US)

(73) Assignee: ANGETIS AIR LLC, Columbia, MD (US)

( * ) Notice: Subject to any disclaimer, the term of this patent is extended or adjusted under 35 U.S.C. 154(b) by 0 days.

(21) Appl. No.: 18/208,845

(22) Filed: Jun. 12, 2023

(65) Prior Publication Data
US 2023/0405603 A1    Dec. 21, 2023

Related U.S. Application Data

(60) Provisional application No. 63/351,411, filed on Jun. 12, 2022.

(51) Int. Cl.
*B03C 3/66* (2006.01)
*B03C 3/08* (2006.01)
*B03C 3/47* (2006.01)

(52) U.S. Cl.
CPC ............... *B03C 3/66* (2013.01); *B03C 3/08* (2013.01); *B03C 3/47* (2013.01)

(58) Field of Classification Search
CPC .. B03C 3/08; B03C 3/12; B03C 3/368; B03C 3/41; B03C 3/47; B03C 3/66; B03C 3/68; B03C 2201/24; B03C 2201/28
See application file for complete search history.

(56) References Cited

U.S. PATENT DOCUMENTS

| 895,729 A | 8/1908 | Cottrell |
| 2,958,393 A * | 11/1960 | Lueder ............... B03C 3/47 96/99 |
| 3,837,145 A * | 9/1974 | Festner ............... B03C 3/47 52/750 |
| 3,915,672 A | 10/1975 | Penney |
| 5,055,118 A * | 10/1991 | Nagoshi ............. B03C 3/60 96/99 |
| 6,504,308 B1 | 1/2003 | Krichtafovitch et al. |
| 6,664,741 B1 | 12/2003 | Krichtafovitch |
| 6,937,455 B2 | 8/2005 | Krichtafovitch et al. |

(Continued)

FOREIGN PATENT DOCUMENTS

DE  2854742 A  *  7/1980  ............... B03C 3/12
JP  H0889844 A  *  4/1996

OTHER PUBLICATIONS

U.S. Appl. No. 63/351,339, filed Jun. 12, 2022, Igor Krichtafavitch.

(Continued)

*Primary Examiner* — Jennifer Dieterle
*Assistant Examiner* — Sonji Turner
(74) *Attorney, Agent, or Firm* — UNGERMAN IP PLLC; Mark E. Ungerman

(57) ABSTRACT

An electrostatic precipitator particle collection unit with a particle collecting electrode and a repelling electrode fabricated with static dissipative materials. The static dissipative material may be a polymer, may be a synthetic polymer, and may be a moldable polymer. The electrode plates may be formed from thermoplastic or thermoset polymer.

11 Claims, 5 Drawing Sheets

(56) References Cited

U.S. PATENT DOCUMENTS

| | | | | |
|---|---|---|---|---|
| 7,077,890 | B2* | 7/2006 | Botvinnik | B03C 3/08 |
| | | | | 422/186.04 |
| 7,081,155 | B2* | 7/2006 | Loreth | B03C 3/47 |
| | | | | 96/87 |
| 7,594,958 | B2 | 9/2009 | Krichtafovitch et al. | |
| 7,652,431 | B2* | 1/2010 | Krichtafovitch | H01J 49/04 |
| | | | | 315/111.21 |
| 7,771,671 | B2* | 8/2010 | Taylor | B03C 3/49 |
| | | | | 422/186.04 |
| 7,897,118 | B2* | 3/2011 | Taylor | B01D 53/32 |
| | | | | 422/186 |
| 8,357,233 | B2* | 1/2013 | Chan | B03C 3/08 |
| | | | | 96/81 |
| 8,551,228 | B2* | 10/2013 | Chan | B03C 3/32 |
| | | | | 96/81 |
| 8,690,996 | B2* | 4/2014 | Ji | B03C 3/12 |
| | | | | 95/79 |
| 9,488,382 | B2* | 11/2016 | Krichtafovitch | F24F 13/28 |
| 9,682,384 | B2 | 6/2017 | Afanasiev et al. | |
| 9,808,808 | B2* | 11/2017 | Wen | B03C 3/70 |
| 9,827,573 | B2 | 11/2017 | Afanasiev et al. | |
| 10,668,483 | B2* | 6/2020 | Krichtafovitch | B03C 3/72 |
| 10,792,673 | B2 | 10/2020 | Krichtafovitch | |
| 10,828,646 | B2 | 11/2020 | Rothenberg et al. | |
| 10,875,034 | B2 | 12/2020 | Krichtafovitch | |
| 10,882,053 | B2 | 1/2021 | Krichtafovitch | |
| 10,960,407 | B2 | 3/2021 | Krichtafovitch et al. | |
| 11,123,750 | B2 | 9/2021 | Krichtafovitch | |
| 11,615,936 | B2* | 3/2023 | Subrahmanyam | H01T 23/00 |
| | | | | 315/111.91 |
| 2005/0152818 | A1* | 7/2005 | Botvinnik | B03C 3/08 |
| | | | | 422/186.04 |
| 2017/0354977 | A1 | 12/2017 | Krichtafovitch | |
| 2017/0354978 | A1* | 12/2017 | Krichtafovitch | B03C 3/41 |
| 2018/0001548 | A1 | 1/2018 | Dietrich et al. | |
| 2020/0360936 | A1 | 11/2020 | Lee et al. | |
| 2020/0368384 | A1 | 11/2020 | Rosenørn et al. | |
| 2022/0331816 | A1* | 10/2022 | Park | B03C 3/86 |
| 2023/0398551 | A1 | 12/2023 | Krichtafovitch et al. | |
| 2024/0017272 | A1 | 1/2024 | Krichtafovitch et al. | |

OTHER PUBLICATIONS

U.S. Appl. No. 63/351,411, filed Jun. 12, 2022, Igor Krichtafovitch.

Conductive Polymer, Wikipedia, pp. 10, retrieved from https://en.wikipedia.org on Jun. 7, 2022.

Delahunt, Kevin, NAFA (National Air Filtration Association), Best Practice Guidelines, Filtration for Residential HVAC Industry, Feb. 26, 2023, 14 pgs., retrieved from www.nafahq.org.

EPA, Guide to Air Cleaners in the Home, 2nd Edition, Portable Air Cleaners Furnace and HVAC Filters, Jul. 2018, pp. 7, US, retrieved from www.epa.gov.

EPA, Residential Air Cleaners, A Technical Summary, 3rd Edition, Portable Air Cleaners Furnace and HVAC Filers, Jul. 2018, pp. 74, US, retrieved from www.epa.gov.

Jane H. Davidson & Peter J. Mckinney, Chemical Vapor Deposition in the Corona Discharge of Electrostatic Air Cleaners, Aerosol Science and Technology, Aug. 1998, vol. 29:2, Taylor & Francis Group, retrieved https://www.tandfonline.com.

Lew Harriman, et al., New Guidance for Residential Air Cleaners, Ashrae Journal, Sep. 2019, pp. 8, retrieved from URL www.ashrae.org.

M.B. Awad & GSP Castle, Ozone Generation in an Electrostatic Precipitator With a Heated Corona Wire, Journal of the Air Pollution Control Association, Apr. 1975, vol. 25, No. 4, Taylor & Francis Group, retrieved from https://www.tandfonline.com.

RTP Imagineering Plastics, Conductive Thermoplastics, Reliable and Safe Solutions Using Thermoplastic Technologies, pp. 16, retrieved from www.rtpcompany.com.

* cited by examiner

SPARK TOLERANT ELECTROSTATIC PRECIPITATOR

RELATED APPLICATIONS

This present application claims priority to provisional Application No. 63/351,411 filed Jun. 12, 2022, the disclosure of which is expressly incorporated herein. The subject matter of this application relates to non-provisional application Ser. No. 18/208,844 and non-provisional application Ser. No. 18/208,847, both filed on even date herewith and having the same applicant as this application and both of which claim priority to provisional Application No. 63/351,339 filed Jun. 10, 2022. The subject matter of this application relates to non-provisional application Ser. No. 18/208,842 filed on even date herewith and having the same applicant as this application and which claims priority to provisional Application No. 63/350,866 filed Jun. 9, 2022, the disclosures of all of which are expressly incorporated herein.

BACKGROUND OF THE INVENTION

1. Field of Invention

The invention relates to electrostatic precipitators and more particularly to variable controls for electrostatic precipitators.

2. Description of the Related Technology

Indoor air quality (IAQ) is the air quality within and around buildings and structures. IAQ is known to affect the health, comfort, and well-being of building occupants. Poor indoor air quality has been linked to sick building syndrome, reduced productivity, and impaired learning in schools.

IAQ can be affected by gases (including carbon monoxide, radon, and volatile organic compounds), particulates, microbial contaminants (mold, bacteria), or any mass or energy stressor that can induce adverse health conditions. Source control, filtration, and the use of ventilation to dilute contaminants are the primary methods for improving indoor air quality in most buildings. Residential units can further improve indoor air quality by routine cleaning of carpets and area rugs.

Determination of IAQ involves the collection of air samples, monitoring of human exposure to pollutants, collection of samples on building surfaces, and computer modeling of airflow inside buildings.

IAQ is part of indoor environmental quality (IEQ), which includes IAQ as well as other physical and psychological aspects of life indoors (e.g., lighting, visual quality, acoustics, and thermal comfort).

Indoor air pollution is a major health hazard. A major source of indoor air pollution is the burning of biomass for heating and cooking. This results in high concentrations of particulate matter.

Indoor workplaces are found in many working environments such as offices, sales areas, hospitals, libraries, schools, and preschool childcare facilities. At such workplaces, no tasks involving hazardous substances are performed, and they do not include high-noise areas. Nevertheless, employees may exhibit symptoms belonging to the sick building syndrome such as the burning of the eyes, scratchy throat, blocked nose, and headaches.

There are many bacteria of health significance found in indoor air and on indoor surfaces.

Many common building materials used before 1975 contain asbestos, such as some floor tiles, ceiling tiles, shingles, fireproofing, heating systems, pipe wraps, taping muds, mastics, and other insulation materials. Normally, significant releases of asbestos fiber do not occur unless the building materials are disturbed, such as by cutting, sanding, drilling, or building remodeling. Removal of asbestos-containing materials is not always optimal because the fibers can be spread into the air during the removal process. A management program for intact asbestos-containing materials is often recommended instead. When asbestos-containing material is damaged or disintegrates, microscopic fibers are dispersed into the air. Inhalation of asbestos fibers over long exposure times is associated with an increased incidence of lung cancer, in particular the specific form of mesothelioma. The risk of lung cancer from inhaling asbestos fibers is significantly greater for smokers, however, there is no confirmed connection to damage caused by asbestosis. The symptoms of the disease do not usually appear until about 20 to 30 years after the first asbestos exposure.

Asbestos is found in older homes and buildings but occurs most commonly in schools, hospitals, and industrial settings. Although all asbestos is hazardous, friable products, e.g., sprayed coatings and insulation, pose a significantly higher hazard as they are more likely to release fibers into the air. The US Federal Government and some states have set standards for acceptable levels of asbestos fibers in indoor air. There are particularly stringent regulations applicable to schools.

Atmospheric particulate matter, also known as particulates, can be found indoors and can affect the health of occupants. Authorities have established standards for the maximum concentration of particulates to ensure indoor air quality.

In 2015, experimental studies reported the detection of significant episodic (situational) cognitive impairment from impurities in the air breathed by test subjects who were not informed about changes in the air quality. Researchers at Harvard University and SUNY Upstate Medical University and Syracuse University measured the cognitive performance of 24 participants in three different controlled laboratory atmospheres that simulated those found in "conventional" and "green" buildings, as well as green buildings with enhanced ventilation. Performance was evaluated objectively using the widely used Strategic Management Simulation software simulation tool, which is a well-validated assessment test for executive decision-making in an unconstrained situation allowing initiative and improvisation. Significant deficits were observed in the performance scores achieved in increasing concentrations of either Volitive Organic Compounds ("VOCs") or carbon dioxide while keeping other factors constant. The highest impurity levels reached are not uncommon in some classroom or office environments.

The use of air filters can trap some air pollutants. The Department of Energy's Energy Efficiency and Renewable Energy section suggests that "[Air] Filtration should have a Minimum Efficiency Reporting Value (MERV) of 13 as determined by ASHRAE 52.2-1999." Cooling systems may include cooling coils that tend to gather condensate and may be wet. Air filters may be used to reduce the amount of dust that reaches the wet coils. Such dust is undesirable when the dust contacts wet coils, the dust can serve as food to grow molds on the wet coils and in the ventilation ducts and can reduce the efficiency of the coils. One of the biggest problems in electrostatic filters is an unwanted occasional electrical discharge between the electrodes. ASHRAE standard 52.2 stipulates air purifier testing using carbon black, which contains electrically conductive dust. In some industrial areas, most notoriously in China, so-called "Asian dust" also carries dust that contains metal particles. After a certain time of exposure to such dust, a conductive layer forms on the inter-electrode surfaces. The conductive layer may cause an electrical short between the electrodes.

Traditional media filters and HEPA filters (also known as mechanical filters) have the drawback of energy inefficiency and decreasing efficiency over time due to the clogging of filters. In high-pollution environments, the use of filters may require more energy for air movement. In addition, the use of media filters in high-pollution environments may result in a need for frequent replacement of the media filters. Mechanical filters are expensive and better filtration always comes at a substantial increase in cost due to energy costs and media costs. Another drawback to mechanical filters is the noise attributed to air movement devices like fans. The back pressure created by blocking mechanical filters must be overcome by fans, which can be noisy and annoying, particularly in residential settings. The backpressure at a mechanical media filter increases over time as the mechanical filter is loaded thereby requiring more force to push air past or through the mechanical filters. More force comes at the expense of more noise and more energy.

Additional information is available from the US Environmental Protection Agency (EPA) and the American Society of Heating, Refrigerating and Air-Conditioning Engineers (ASHRAE). According to the EPA, the most effective ways to improve indoor air are to reduce or remove the sources of pollutants and to ventilate with clean outdoor air. In addition, research shows that filtration can be an effective supplement to source control and ventilation. Using a portable air cleaner and/or upgrading the air filter in your furnace or central heating, ventilation, and air-conditioning (HVAC) system can help to improve indoor air quality. Portable air cleaners, also known as air purifiers or air sanitizers, are designed to filter the air in a single room or area. A central furnace or HVAC filter is designed to filter the air throughout a home. Portable air cleaners and HVAC filters can reduce indoor air pollution; however, they cannot remove all pollutants from the air.

The following publications provide information on portable air cleaners and HVAC and furnace filters commonly used in homes.

The EPA has issued a short consumer guide covering portable air cleaners and furnace or HVAC filters used in a home. It includes tips for selecting a portable air cleaner, furnace filter, or HVAC filter. *Guide to Air Cleaners in the Home, 2nd edition*, August 2018 *Portable Air Cleaners, Furnace and HVAC Filters*, available online at: https://www.epa.gov/sites/production/files/2018-07/documents/guide_to_air_cleaners_in_the_home_2nd_edition.pdf the disclosure of which is expressly incorporated by reference herein.

The EPA has also issued guidance in the form of a technical summary *Residential Air Cleaners: A Technical Summary, 3rd edition*, August 2018 *Portable Air Cleaners Furnace and HVAC Filters*, available online at: https://www.epa.gov/sites/production/files/2018-7/documents/residential_air_cleaners_—_a_technical_summary_3rd_edition.pdf the disclosure of which is expressly incorporated by reference herein, focusing on air cleaners for residential use; it does not address air cleaners used in large or commercial structures such as office buildings, schools, large apartment buildings, or public buildings. In addition to providing general information about the types of pollutants affected by air cleaners, this document discusses the types of air-cleaning devices and technologies available, metrics that can be used to compare air-cleaning devices, the effectiveness of air-cleaning devices in removing indoor air pollutants, and information from intervention studies on the effects that air cleaners can have on health and health markers.

See also, Harriman Stephens, Brennan—*New Guidance for Residential Air Cleaners—ASHRAE Journal* September 2019 (pdf) (September 2019) (https://www.epa.gov/sites/default/files/2019-09/documents/harriman_stephens_brennan_-_new_guidance_for_residential_air_cleaners_—_ashrae_journal_sept-2019._web_version.pdf), the disclosure of which is expressly incorporated by reference herein published by the American Society of Heating, Refrigerating and Air-Conditioning Engineers (ASHRAE).

An electrostatic precipitator (ESP) is a filtration device that removes fine particles, like dust and smoke, from a flowing gas using the force of an induced electrostatic charge minimally impeding the flow of gases through the unit.

Traditional ESPs apply energy only to the particulate matter being collected and therefore are very efficient in their consumption of energy (in the form of electricity). Electrostatic precipitators use corona discharge to generate ions. Early use of corona discharge to remove particles from an aerosol was by Hohlfeld in 1824. However, electrostatic precipitators were not commercialized until almost a century later. In 1907 Frederick Gardner Cottrell, a professor of chemistry at the University of California, Berkeley, patented a device for charging particles and then collecting them through electrostatic attraction—the first electrostatic precipitator. See U.S. Pat. No. 895,729. Cottrell first applied the device to the collection of sulfuric acid mist and lead oxide fumes emitted from various acid-making and smelting activities.

At the time of Cottrell's invention, the theoretical basis for the operation was not understood. The operational theory was developed later in Germany, with the work of Walter Deutsch and the formation of the Lurgi company.

Electrophoresis is the term used for the migration of gas-suspended charged particles in a direct-current electrostatic field. The most basic precipitator contains a row of thin vertical wires, followed by a stack of large flat metal plates oriented vertically, with the plates typically spaced about 1 cm to 18 cm apart, depending on the application. The airstream flows horizontally through the spaces between the wires and then passes through the stack of plates.

A negative voltage of several thousand volts is applied between the wire and the plate. If the applied voltage is high enough, an electric corona discharge ionizes the air around the electrodes, which then ionizes the particles in the air stream.

The ionized particles, due to the electrostatic force, are diverted toward the grounded plates. Particles build up on the collection plates and are removed from the air stream.

Metal plate precipitators are commonly marketed to the public as air purifier devices or as a permanent replacement for furnace filters, but all have the undesirable attribute of being somewhat messy to clean. A negative side-effect of electrostatic precipitation devices is the potential production of toxic ozone and NO. However, electrostatic precipitators offer benefits over other air purification technologies, such as HEPA filtration, which require expensive filters and can become "production sinks" for many harmful forms of bacteria.

With electrostatic precipitators, if the collection plates are allowed to accumulate large amounts of particulate matter, the particles can sometimes bond so tightly to the metal plates that vigorous washing and scrubbing may be required to completely clean the collection plates. The close spacing of the plates can make thorough cleaning difficult, and the stack of plates often cannot be easily disassembled for cleaning. One solution, suggested by several manufacturers, is to wash the collector plates in a dishwasher.

Some consumer precipitation filters are sold with special soak-off cleaners, where the entire plate array is removed from the precipitator and soaked in a large container overnight, to help loosen the tightly bonded particulates.

The Applicant or its predecessors in interest developed an ESP that uses a collecting electrode plate that has a conductive layer sandwiched between non-conductive open cell material layers, as shown in U.S. Pat. Nos. 9,488,382 and 10,668,483 the disclosures of which are expressly incorporated by reference herein. Other patents assigned or licensed to Applicant include: U.S. Pat. Nos. 9,682,384; 9,808,808; 9,827,573; 10,828,646; 10,875,034; 10,882,053; 10,792,673; 10,960,407; and 11,123,750. The disclosures of each of the identified patents are expressly incorporated by reference herein.

The Applicant has developed an ESP that uses a conductive layer sandwiched between non-conductive open cell material layers, as shown in U.S. Pat. Nos. 9,488,382 and 10,668,483 the disclosures of which are expressly incorporated by reference herein. Other patents assigned or licensed to Applicant include U.S. Pat. Nos. 9,682,384; 9,808,808; 9,827,573; 10,792,673; 10,828,646; 10,875,034; 10,882,053; 10,960,407; and 11,123,750. The disclosures of each of the identified patents are expressly incorporated by reference herein.

A known byproduct of corona discharge is the production of ozone. Because of the strongly oxidizing properties of ozone, ozone is a primary irritant, affecting especially the eyes and respiratory systems, and can be hazardous at even low concentrations.

According to M. B. Awad, et al., Ozone Generation in an Electrostatic Precipitator With a Heated Corona Wire, *Journal of the Air Pollution Control Association*, 24 (4): 369 (April 1975), G. S. P. Castle, et al., "Ozone generation in positive corona electrostatic precipitators," *I.E.E.E. Trans.*, IGA-5 (4): 489 (1969), the disclosures of which are expressly incorporated by reference herein, two-stage electrostatic precipitators are widely used for high-efficiency collection of submicron particulates in air cleaning applications where recirculation of the air is required.

In existing two-stage precipitators, dust particles are charged in a short positive corona section. Dust collection takes place in a downstream static electric field region. Typically, dust particles are charged to the maximum possible level and the collection field strength is kept at a high level. The upper level for the collection field strength is set by the electric breakdown strength of air. Maximizing collection involves charging dust particles to the maximum possible level and establishing the strongest possible field, short of breakdown, around the collecting plates.

The magnitude of the charge that is produced on the particles is determined by the corona current density that exists in the charging section. However, increasing the corona current also results in an increase in the amount of ozone that is generated by the discharge. Present American industrial standards limit the allowable exposure to $O_3$ of 0.10 ppm by volume for an 8-hour day. Therefore, to maintain acceptable $O_3$ concentrations for given air flows through the precipitator, it is necessary to keep the magnitude of the corona current much below the maximum levels that it is possible to obtain before sparkover occurs. "In a previous paper, the design parameters required to minimize $O_3$ generation were discussed in detail, and it was confirmed that the limiting factor involved selecting a corona wire of the smallest possible diameter compatible with mechanical strength. In this present paper it will be shown that a major reduction in the $O_3$ levels may be obtained by heating the corona wire." Id. at 370.

The magnitude of the charge that is transferred to the particles is dependent on the corona current density that exists in the charging section. However, increasing the corona current also increases the amount of ozone that is generated by the discharge. Present American industrial standards limit the allowable exposure to $O_3$ to 0.10 ppm by volume for an 8-hour day. Therefore, to maintain acceptable $O_3$ concentrations for given air flows through the precipitator, it is necessary to keep the magnitude of the corona current below the spark threshold voltage level. The spark threshold voltage level is the voltage at which spark-over occurs. The limiting design parameters required to minimize $O_3$ generation involve selecting a corona wire of the smallest possible diameter compatible with mechanical strength. A reduction in the $O_3$ levels may be obtained by heating the corona wire.

U.S. Pat. No. 7,594,958, the disclosure of which is expressly incorporated by reference herein, shows a spark management device that includes a high-voltage power source and a detector configured to monitor a parameter of an electric current provided to a load device. In response to the parameter, a pre-spark condition is identified. A Switching circuit is responsive to the identification of the peak-spark condition for controlling the electric current provided to the load device to manage sparking. Management of sparking includes, but is not limited to, reducing the occurrence of sparks, eliminating sparks, regulating sparks, timing sparks, and/or controlling the intensity of any sparks generated.

In conventional electrostatic air purifiers, all the electrodes with different electrical potentials are attached to the common case walls and are separated by a certain distance along the surface of the walls. Once conductive dust is collected on the wall it may cause an electrical short between the electrodes. Such a short may be called a "creeping" discharge along the surface of the wall. US 2018/001548 A1, the disclosure of which is expressly incorporated herein by reference, shows an electrostatic air cleaner designed to reduce "creeping" discharge by extending the effective creeping distance by configuring the electrodes with opposing polarity to be mounted at locations spaced apart from each other.

U.S. Pat. No. 9,488,382, the disclosure of which is expressly incorporated herein by reference, entitled "Electronic Air Cleaners and Associated Systems and Methods" shows an electrostatic air cleaner that collects and removes particles such as dust, pollen, smoke, pathogens, and other contaminants from the air by use of electric corona discharge. The air cleaner has an ionizing stage and a collection stage. The ionizing stage has exciting electrodes and corona electrodes. The collection stage has collecting electrodes and repelling electrodes. The collecting electrodes have a conductive core between open-cell sheets. The open-cell sheets have a much greater surface area than a flat metal plate.

When a corona electrode is operated in an environment that includes certain chemicals, such as silicone, the chemical particles, which reduce performance, may accumulate on the electrodes. Accumulation of such chemical particles may require that the electrodes be cleaned or replaced from time to time. J. H. Davidson, P. J. Mckinney, *Chemical Vapor Deposition in the Corona Discharge of Electrostatic Air Cleaners*, Journal of Electrostatics, 29 (2): 102-110, 1998, expressly incorporated herein by reference.

SUMMARY OF THE INVENTION

Surface resistivity is the resistance to leakage current along the surface of a structure, generally an insulating material. Volume resistivity is the resistance to leakage current through the body of a structure, generally an insulating material. The higher the surface/volume resistivity, the lower the leakage current and the less conductive the material is. It is an object to take advantage of the electrical and physical characteristics of a material to be used as an electrode in an electrostatic air cleaner. The materials must have characteristics suitable for particle collection and are provided to increase the tolerance to sparking.

Electrostatic precipitators may have two or more sets of electrodes. The electrodes may include a set of corona electrodes, a set of collection electrodes, a set of repelling electrodes, and potentially, a set of exciting electrodes. A high voltage power supply may be provided establishing a potential difference between the corona electrodes and the collecting electrodes at a level between the corona onset voltage and the breakdown voltage. The operation of the power supply can mitigate sparking by detecting pre-spark conditions and rapidly reducing voltage output of the power supply or shutting off the power supply upon detection of a pre-spark spark condition. The mitigation effect results in changes to the voltage level in all parts of a conductive electrode set and greatly reduces the efficiency of the electrostatic precipitator. It is an object to enhance efficiency by avoiding or minimizing the need to power down the power supply. A spark occurrence is essentially a short circuit that will bring the affected electrode sets to the same potential thereby eliminating the corona field and interrupting the operation of the entire set of affected electrodes. The reduction in efficiency may run across the entire precipitator.

Sparks also have the normally undesired effect of generating ozone, which may impact the safety of the precipitator and elevate ozone creation to the point that it is perceptible by those near the precipitator or in the airflow path. It is essential to keep the ozone levels for occupants of the space to acceptable and regulated levels. The objects can be attained by utilizing electrodes with an appropriate level of conductivity to allow generation of the desired electrical field but sufficient resistivity to mitigate sparking. The use of resistive collecting and or repelling electrodes in an electrostatic precipitator will allow the current that results from a spark to be dissipated over a limited distance and thereby avoid dropping the voltage differential between the entire sets of affected electrodes, commonly the collecting electrodes and repelling electrodes.

This object can be attained by utilizing static dissipative materials or anti-static materials in the collecting and/or repelling electrodes. These elements will dissipate the current over the distance between the point of the spark and the point of connection to a power supply, assuming that the power supply is connected to the electrodes by conductive elements such as wires. Sparks may occur at locations determined by the point of least resistance to the spark. This point may vary due to the conductivity of the space between electrodes due to distance, collected particle build-up, temporary presence of conductive material, and/or other factors.

When conductive (metal) plates are used in the collecting and repelling electrode the model of the circuit created by a spark approximates a short-circuit across the power supply connections. Utilizing static dissipative materials alters the model of this circuit to be a power supply connection to one electrode through a resistor to the point of the spark/short-circuit on one electrode and another resistor between the point of the spark/short-circuit on the other electrode to the power-supply connection for the other electrode. The resistance for each electrode is roughly correlated to the distance between the location of the spark and the connection to the power supply.

The lowest combined resistance of both electrodes will be related to the distance between the connection of the power supply to the repelling electrode and the connection of the power supply to the collecting electrode. The lowest combined resistance of the electrodes to a spark may be increased by spacing the connection of the power supply to the repelling electrode from the connection of the power supply to the collecting electrode. One way to accomplish the increased minimum resistance is to make the power supply connections on opposite sides of the collection assembly. For example, one side of the power supply may be connected to collecting electrodes at one side of the collection assembly and the other side of the power supply may be connected to the repelling electrode at an opposing side of the collection assembly.

There is a balance between the volume (or surface) resistivity of the electrode materials and the field strength between the electrodes. Enhanced tolerance to spark conditions while maintaining an acceptable level of material conductivity may be achieved by extending the shortest travel distance from the power supply connection of one electrode through the location of a spark condition to the power supply connection of the other electrode. The shortest travel distance may be further extended by modifying the geometry of the electrodes.

Because the tolerance to a spark condition is related to the current travel distance if a spark were to occur, the tolerance may be further enhanced by the configuration of the electrode. For example, an interruption in the current flow path through an electrode, such as by incorporating highly resistive barriers to current may extend the path. This may be accomplished by chemical treatment of the appropriate areas of the electrode or by cut-outs to establish a switch-back surface path. A single switch-back to establish a "C" will increase travel distance. A double switch-back to establish an "S" will increase the travel distance further. For example, an "S" shaped repelling (and/or collecting) electrode may have nearly the same surface area as a sheet electrode but can greatly extend the average distance of points "around the bend" of the "S" shaped electrode to a connection point.

An electrostatic precipitator may have an electrode pair with a first electrostatic precipitator electrode element arranged parallel to a second electrostatic precipitator electrode element. The first electrostatic precipitator electrode element may be configured for connection to a first electrical potential at a first connection location and the second electrostatic precipitator electrode element may be configured for connection to a second electrical potential at a second connection location. The difference between the first electrical potential and the second electrical potential may be a high voltage sufficient to create an electrostatic field to repel charged particles away from one of the electrostatic precipitator electrode elements and attract the charged particles toward the other electrostatic precipitator electrode element.

The first connection location may be remote from the second connection location and the first electrostatic precipitator electrode element resistivity along a current flow path between the first connection location and a location corresponding to the second connection location is at a level sufficient to dissipate spark events. The first electrostatic precipitator electrode may include an interruption that extends the current flow path. The interruption may be a non-conductive segment between the first connection location and a position corresponding to the second connection location. The first and second connection locations define a "medial axis" of the first electrostatic precipitator electrode element and the non-conductive segment is arranged to transect the medial axis. The non-conductive segment may extend from a first lateral edge of the first electrostatic precipitator electrode element and may establish a C-shaped electrode element. A second non-conductive segment may extend from a second lateral edge opposing the first lateral edge the second non-conductive segment may also transect the medial axis further extending said current flow path.

The first non-conductive segment and the second non-conductive segment may establish an S-shaped electrode element. The electrostatic precipitator electrode element may be made of a static dissipative material, for example, a moldable synthetic polymer. The non-conductive segment of the electrode element may be defined by an absence of material forming the electrostatic precipitator electrode element. A non-conductive stabilizing element may be provided in at least a portion of a region of the electrode element. The non-conductive segment may transect the medial axis. The non-conductive segment may be insulating material molded into an electrostatic precipitator electrode element. The non-conductive segment may be defined by treating a segment of the static dissipative material to locally increase resistance. The configuration of the second electrostatic precipitator electrode element may correspond to the configuration of the first electrostatic precipitator electrode element.

The electrostatic precipitator electrode plates may have multiple interleaved non-conductive segments extending in opposing directions to define a switchback current path. The switchback current path may have at least two switchbacks. The electrostatic precipitator electrode plates may have multiple interleaved non-conductive segments extending in opposing directions to define a switchback current path having 2 to 10 switchbacks.

It is a further object to utilize electrode materials that are resistant to spark conditions. RTP Company of Winona, MN offers conductive compounds that span the surface resistivity spectrum from $10^1$ to $10^{12}$ ohms/square that can be formulated for injection molding or extrusion processes. RTP also offers anti-static compounds having a surface resistivity of $10^{10}$ to $10^{12}$ Ohms/sq. and materials that have higher resistivities, including Antistatic compounds having higher surface resistivity and lower surface resistivity. In addition, RTP offers materials, as shown in its brochure entitled Conductive Thermoplastics-Reliable and Safe Solutions Using Thermoplastic Technologies (the disclosure of which is expressly incorporated herein), 10/2020. Copyright 2020 as follows:

Anti-static Compounds ($10^{10}$ to $10^{12}$ Ohms/sq.) provide a relatively slow decay of static charge—from just hundredths to several seconds-thus preventing accumulations that may discharge or initiate other nearby electrical events. These decay properties are inherent to the material and are not humidity dependent or limited by the fragility of anti-static coatings.

Static Dissipative Compounds ($10^6$ to $10^{12}$ Ohms/sq.) allow for the dissipation or decay of static charges at a faster rate than anti-static materials—generally within milliseconds. Materials that offer the "optimal" ESD protection ($10^6$ to $10^9$) are at the stronger end of the static dissipative range.

Conductive Compounds ($10^1$ to $10^6$ Ohms/sq.) with decay/dissipation rates measured in nanoseconds provide a ground pathway and bleed off strong static charges. These levels of conductivity are achieved by incorporating carbon fiber, high levels of carbon powder, or other conductive additives. Note that RTP offers materials that have a surface resistivity of $10^1$ to $10^6$ Ohm/sq. that it calls "Conductive compounds" and describes as "Conductive." For clarity, this specification uses "conductive" to describe a material with a surface resistivity equal to or less than $10^{12}$ Ohm/sq and uses "Conductive ($10^1$-$10^6$)" to mean a material having a surface resistivity of $10^1$ to $10^6$ Ohm/sq).

EMI/RFI Shielding Compounds ($10^1$ to $10^4$ Ohms/sq.) compounds are typically qualified by means other than electrical conductivity, as their true function is in blocking electromagnetic and radio frequency energy. These shielding compounds absorb and/or reflect electromagnetic energy, and thus provide shielding against electromagnetic interference while maintaining the design freedoms inherent in thermoplastic molding compounds.

For example, the collecting electrode materials that may fall into the range of static dissipative materials or anti-static materials rather than to higher resistivity (plastics $10^{12}$ or greater) or lower resistivity categories Conductive ($10^1$-$10^6$) having a surface resistivity of $10^1$ to $10^6$ or EMI/RFI Shielding having a surface resistivity of $10^1$-$10^4$ or metals having a surface resistivity of $10^{-1}$ to $10^{-5}$.)

For enhanced tolerance to spark conditions, the conductivity of the part (electrode) may be in the range that ensures some current flow in normal conditions but prevents sharp current increase in the event of a spark condition that would otherwise create a short (like a spark).

In the case of a spark condition between a highly conductive (metal) collecting electrode and a highly conductive (metal) repelling electrode, both sets of electrodes reach the same electrical potential. When both electrodes are at the same potential there is no electric field in the area separating the electrodes. When this occurs, the collecting efficiency drops significantly (from 90%+ to 10-20% at best).

Utilizing highly resistive electrodes and in particular highly resistive plastic electrodes resolves this issue. For example, the resistivity of the collecting electrodes may be such that the voltage drop along the electrode from the front part (closest to the corona wires) to the point that the electrode is connected to the High Voltage Power Supply ("HVPS") (at the "back of the electrode plates") is around 10%. This voltage drop is quite tolerable.

With a 20 kV power supply, the voltage drop of 10% would be 2 kV and the potential difference between the corona wire and the front of the collecting electrode would still be 18 kV. For the operation of the ESP, 18 KV is sufficient.

In this example, we establish a corona current equal to 0.5 mA, then total collecting plate resistance would be 2 kV/0.5 mA=4 MOhms. If the collecting plate were conductive, a short from the corona wire to the front of the collecting plate would be at the full 20 kV potential. The current will increase greatly from 0.5 mA and without protections, the high voltage power supply would quickly burn or stop operating. However, if the collecting plates were made of anti-static or static dissipative materials, the system would tolerate the short or spark without substantial disruption.

For example, in a precipitator having a collecting plate cartridge with 20 collecting plates, the resistance of each plate may be much higher than the resistance of the collecting plate cartridge as a whole. If the cartridge consists, for example, 20 plates connected in parallel, then each plate's resistance is 4*20=80 MOhms.

Assuming (simply as an example) that the electrode has the dimensions: Height=15 cm, Width=13.5 cm, Thickness=0.215 cm.

The resistance of the electrode is $R=Ro*Width/(Hight*Thickness)=80*10^6$.

Where Ro=volume specific resistivity, Ohm*cm.

$Ro=80*10^6*Hight*Thickness/Width=80*10^6*15*0.215/13.5=19.1*10^9$ Ohm*cm.

This falls in the middle of the category of STATIC DISSIPATIVE material range.

The overall resistance is important because the effects of sparks are not entirely local. The benefits of a static dissipative material are related to how the higher resistance actually "de-localizes" the effect of sparks. If an assembly is static dissipative, a spark's effect takes more time to propagate throughout the entire assembly than through a conductive assembly, which gives the system and power supply more time to re-stabilize and return to "normal" before the spark's effects are seen throughout all of the plates.

It is a further object to provide a collector electrode structure which is more readily recyclable. Multi-layer and multi material structures may not be suitable for recycling. The collector electrode disclosed does not have or require an intermediate conductive layer, for example metal foil. The static dissipative materials treated to have non-conductive regions are similar enough to the untreated static dissipative materials to still be recyclable as a single material structure.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Before the present invention is described in further detail, it is to be understood that the invention is not limited to the embodiments described, as such may, of course, vary. It is also to be understood that the terminology used herein is for the purpose of describing embodiments only, and is not intended to be limiting, since the scope of the present invention will be limited only by the appended claims.

Where a range of values is provided, it is understood that each intervening value, unless the context clearly dictates otherwise, between the upper and lower limit of that range is encompassed within the disclosure. Where the stated range includes one or both limits, ranges excluding either or both of those included limits are also included in the disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The invention is described in detail with respect to preferred embodiments, and it will now be apparent from the foregoing to those skilled in the art that changes, and modifications may be made without departing from the invention in its broader aspects, and the invention, therefore, as defined in the claims, is intended to cover all such changes and modifications that fall within the true spirit of the invention.

Figure 1:
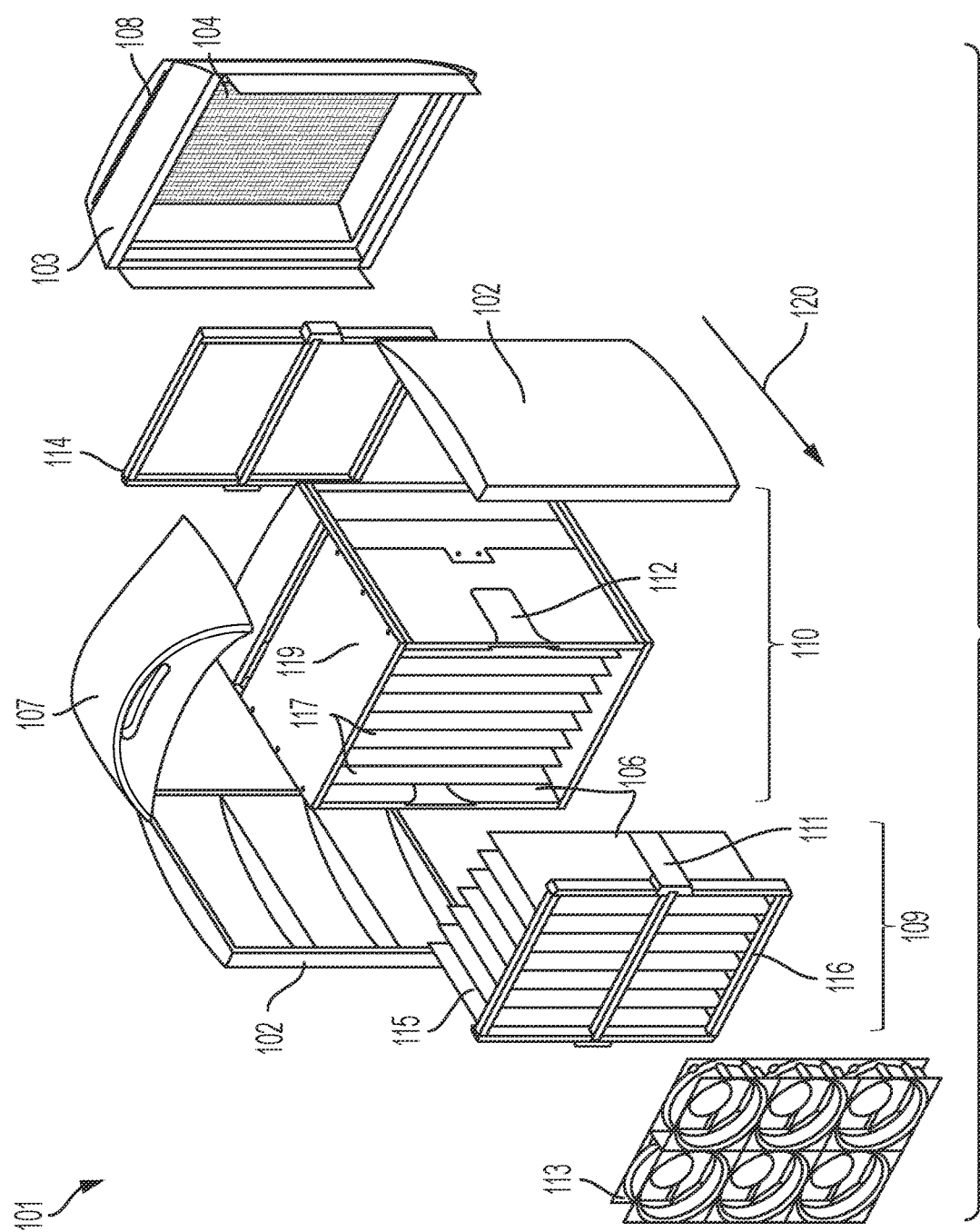
FIG. 1 shows the exploded mechanical schematics of an embodiment of an electrostatic air cleaner.

FIG. 1 schematically shows an exploded view of an electrostatic air cleaner 101 shown. The exploded view of FIG. 1 shows side panels 102 of a case and a top panel 107. An ionizer assembly 103 may be in the front portion of the electrostatic air cleaner 101. A particle collection assembly 106 may be in the main body of the electrostatic air cleaner 101. The ionizer assembly 103 may include emitting wires (not shown in FIG. 1, see FIG. 2). The emitting wires are referred to as corona wire(s) or corona electrode(s). A mesh-like exciting electrode 104 is shown as part of the ionizer assembly 103. The exciting electrode 104 is arranged to cooperate with the corona electrode in establishing a corona field and generating ions. One mounting arrangement for the exciting electrode may include a slot 108 to receive the exciting electrode 104. The exciting electrode 104 (which is preferably earth grounded) may be easily removed through slot 108 for periodic cleaning. A topside panel 107 may include a handle. A high voltage power supply and controls may be mounted in the topside panel. The air cleaner 101 need not be configured with separate ionizer and particle collection assemblies. The components may be installed in a housing without being separated into assemblies.

The particle collection structure 106 may include a particle collecting electrode assembly 109 and a particle repelling electrode assembly 110. When the particle collecting electrode assembly 109 is inserted into the particle collecting structure housing 119, rails 111 may slidably engage slots 112. The particle repelling electrode assembly 110 may be secured on the opposite side of the collecting structure housing 119 from the mounting end of the particle collecting electrode assembly 109. The particle collecting electrode assembly 109 is preferably mounted to the particle collection structure housing 119 at the end opposite the ionizer assembly 103. A fan assembly 113, may be included in the electrostatic air cleaner 101 if needed. The fan assembly may not be needed if the ionizer assembly 103 and the particle collection structure 106 of the electrostatic air cleaner 101 is in a constrained airflow path such as HVAC ductwork, in an HVAC vent, or an exhaust vent. The intended airflow direction during normal operation is shown by arrow 120.

The collecting electrode assembly 109 may include a set of parallel collecting electrode plates 115 mounted to a collecting electrode mounting structure 116. The embodiment illustrated in FIG. 1 has the collecting electrode plates 115 connected at one edge and extending from the collecting electrode mounting structure 116. The repelling electrode assembly 110 may have a similar but reversed configuration having a plurality of repelling electrode plates 117 connected to a repelling electrode mounting structure 114.

The collecting electrode assembly 109 may include a mounting rail 111.

Figure 2:
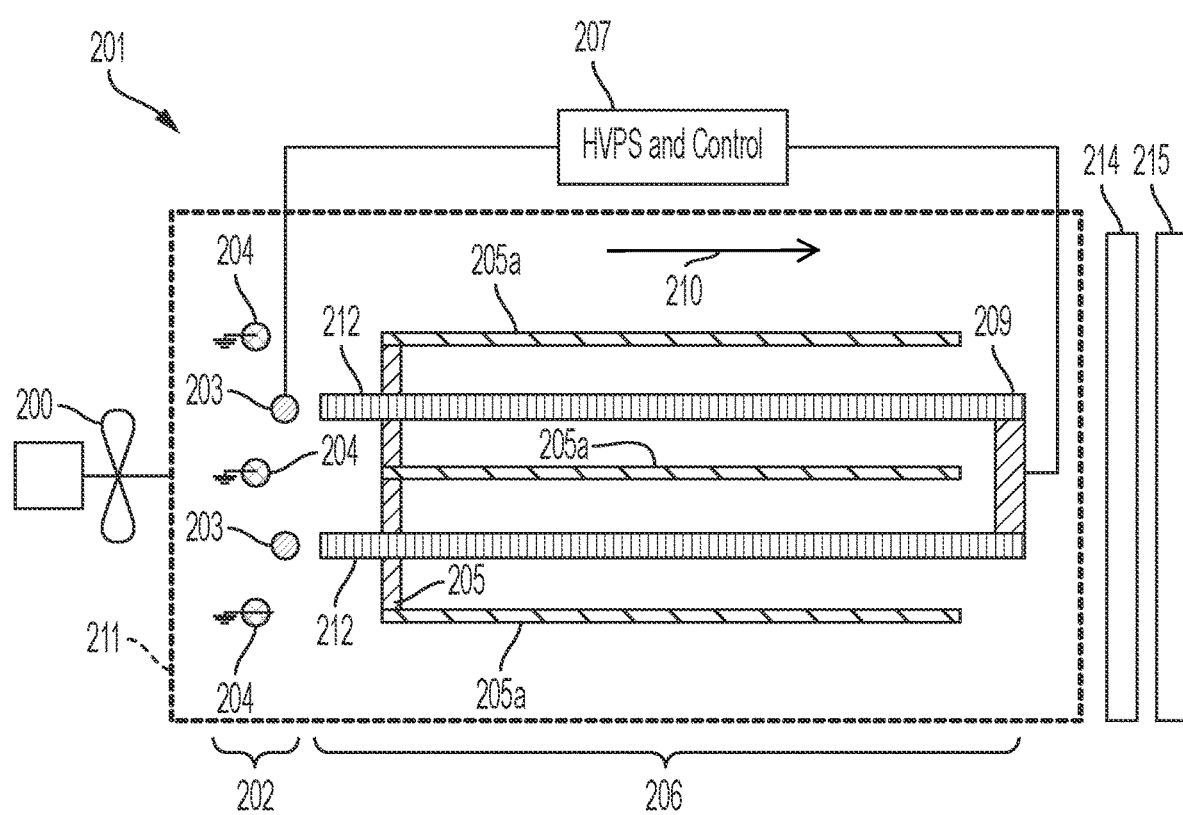
FIG. 2 shows the electrical schematics of an embodiment of an electrostatic air cleaner.

FIG. 2 schematically shows a simplified view of the electrode geometry of an electrostatic air cleaner 201. One or more fans 200 may be provided to control airflow. An ionizing stage 202 may be provided to generate ions. The intended airflow direction during normal operation is shown from left to right by arrow 210. The ionizing stage 202 may include one or more corona electrodes 203 which may be provided near an intake 211 of the electrostatic air cleaner 201. One or more exciting electrodes 204 may be provided near an intake 211 of the electrostatic air cleaner 201 and positioned to co-act with the corona electrode(s) 203. The corona electrode 203 may be a wire which is routed across the airflow path several times for example in front of each collecting electrode plate 212. The exciting electrode 204 may be a conductive grid that is connected to the ground or a ground side of a high-voltage power supply in the high-voltage power system 207. The high-voltage power system 207 may also include a controller and one or more sensors or other controls.

A particle collection stage 206 may be located downstream from the ionizing stage 202. The particle collection stage 206 may include a repelling electrode assembly 205 having one or more repelling electrode plates 205a and a collecting electrode assembly 209 having one or more collecting electrode plates 212. The collecting electrode assembly 209 is positioned to co-act with the repelling electrode assembly 205 so that charged particles move away from the repelling electrode and land on the collecting electrode plates 212. The collecting electrode plates 212 may alternate with parallel repelling electrode plates 205a in the particle collection stage 206. The ionizing stage 202 and the particle collection stage 206 are in an airflow path. The electrostatic air cleaner 201 may include one or more fans 200 to induce or affect airflow or the electrostatic air cleaner 201 may be in a constrained space with an externally induced airflow.

The airflow path may be selectively blocked by closing a blocking structure 214, such as shutters or a blast gate under the control of the high-voltage power system 207 or another controller. An ozone filter 215 may also be provided in the airflow path.

An Amphenol SM-PWM-01A SMART Dust Sensor or a Waveshare Dust Sensor Detector Module with Sharp GP2Y1010AUOF are examples of the type of sensors that may be employed. The control system may also detect or use other environmental parameters including, but not limited to, elevation, air humidity, etc. Additional measures of environmental parameters or conditions allow for complicated and comprehensive power source control.

Figure 3:
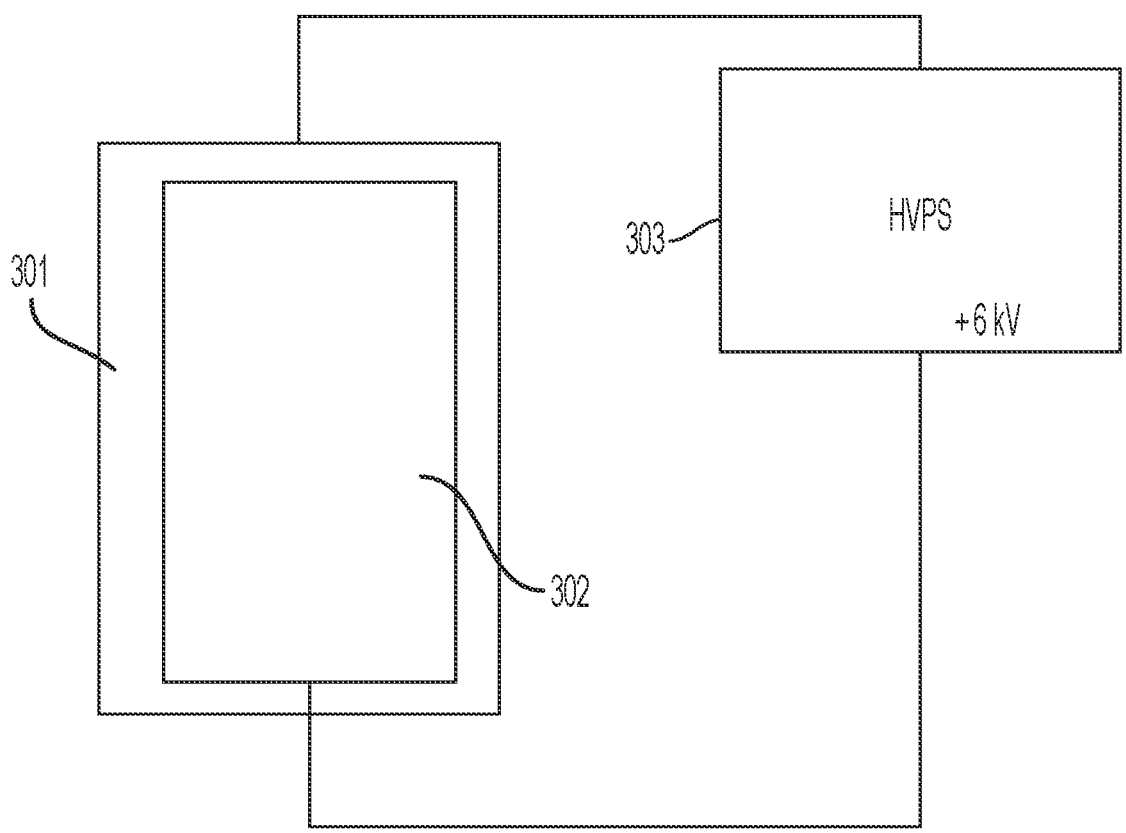
FIG. 3 shows an embodiment of an electrode plate and a connection configuration.

FIG. 3 shows an embodiment of an electrode plate in connection configuration. The electrode plates 301 and 302, for illustrative purposes, are shown separately from the other electrode plates and components of the electrode assemblies. The collecting electrode plate 301 is arranged adjacent and generally parallel to repelling electrode plate 302. In an actual device collecting several electrode plates 301 are interleaved with several repelling electrode plates 302. The high voltage output of high voltage power supply 303 may be connected to repelling electrode plate 302. It is understood that the connection to repelling electrode plate 302 may be via a connection to an assembled repelling electrode structure exhibiting multiple repelling electrode plates. The high voltage power supply 303 may be connected to the collecting electrode plate 301. Advantageously, the high voltage power supply 303 connection to collecting electrode plate 301 is spaced apart from and opposing the location of the connection of high voltage power supply 303 to the repelling electrode plate 302. The current permitted by a spark between collecting electrode plate 301 and repelling electrode plate 302 may be dissipated by the resistivity of the plates. The current flow path would be from the high voltage power supply through one of the electrode plates to the point of a spark and from the point of a spark on the other electrode plate to an opposing side of the high voltage power supply. Because voltage is related to current and resistance, the voltage drop across the adjacent plates during a spark will be at its lowest at the location of the spark and will increase along the current flow paths extending from the location of the spark. FIG. 3 shows that regardless of the location of a spark, the current flow path will be at least as long as the distance between the high voltage power supply connections to the respective electrode plates.

Figure 4:
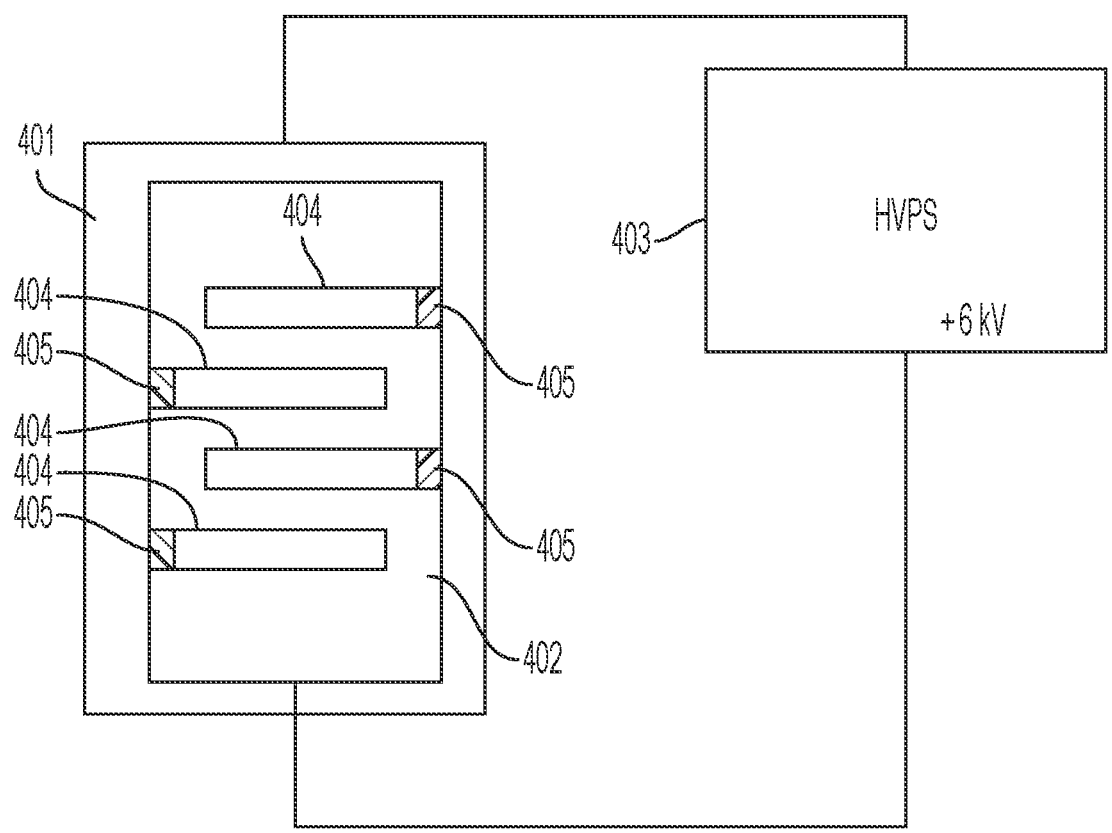
FIG. 4 shows an alternative embodiment of an electrode plate configuration.
Figure 5:
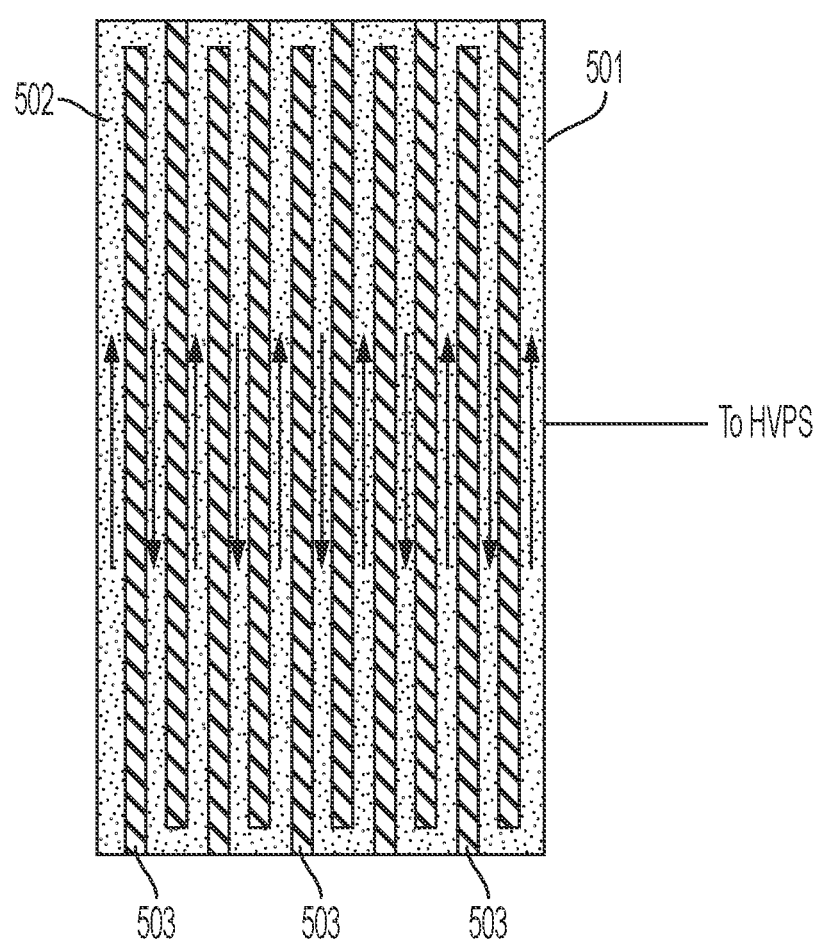
FIG. 5 shows another alternative embodiment of an electrode plate configuration.

FIGS. 4 and 5 show alternative embodiments of electrode plate configurations intended to increase the length of the current flow path in the event of a spark. Current dissipation attributable to a spark will be dependent upon the resistivity of the electrodes. Increasing the current flow path will allow dissipation of current in electrodes having lower resistivity.

FIG. 4 shows a collecting electrode plate 401 which may be arranged adjacent to and parallel with repelling electrode plate 402. FIG. 4 shows that the connections of the respective electrode plates 401 and 402 to the high voltage power supply 403 are spaced from each other. The repelling electrode plate 402 has slots or cut-outs 404 so that it has a serpentine configuration. In order to add mechanical strength, the repelling electrode may include braces 405 of insulating material spanning each of the slots 404, illustrated as defining the serpentine structure of the repelling electrode plate. The collecting electrode plate 401 may also exhibit a serpentine configuration established by slots and may optionally have insulating braces to mechanically reinforced the collecting electrode plates at the location of the slots. The serpentine structure of the collecting plate need not match a serpentine structure of the repelling electrode plate 402. The serpentine configuration of the collecting electrode plate 401 may match the serpentine configuration of the repelling electrode plate 302. Alternatively, the serpentine structure of the collecting plate 401 may mirror the serpentine structure of the repelling electrode plate 402. If the structures of the respective plates match, insulating braces 405 may be utilized to mechanically reinforce 2 or more adjacent electrode plates. This has the advantage of mechanical simplicity, but the disadvantage of allowing creeping voltage leaks to particle deposits over a much shorter mechanical length. Having mirroring serpentine configurations, allows common mechanical braces to be used or the set of collecting electrode plates and different insulating braces to be used for the repelling electrodes. This will have the effect of facilitating a longer creeping voltage leak path.

FIG. 5 shows an electrode plate 501. The electrode plate 501 may be a collecting electrode plate or a repelling electrode plate. The electrode plate 501 may have a medium resistive segment 502 in a serpentine configuration integrated with insulating segments 503 filling the gaps between the switchbacks of the medium resistive segments 502 to define a serpentine configuration. The insulating segments 503 may be integrated with the medium resistance material of the medium resistive segment 502. The electrode plate 501 may be fabricated by various methods. One fabrication technique may be by injection, molding the serpentine structure 502 and subsequently placed in a second mold which permits injection of the insulating material 503. Alternatively, the same injection mold may be used but with gates in the areas designated for the insulating material followed by withdrawal of those gates and injection of insulated material in the spaces vacated by the gates. Another fabrication method may be by first molding a plate as a sheet and mechanically removing the areas where insulating material 503 will be inserted by a separate injection process. Another fabrication method may be by forming a unitary sheet and treating portions of the material of the sheet to increase or decrease resistivity to establish an extended flow path on a serpentine structure of highly resistive material. Medium resistive material may have surface resistivity greater than $10^4$ Ohms/sq., in the range of $10^4$ to $10^{12}$ Ohms/sq., in the range of $10^6$ to $10^{12}$ Ohms/sq., or in the range of $10^{10}$ to $10^{12}$ Ohms/sq.

The techniques, processes, and apparatus described may be utilized to control the operation of any device and conserve the use of resources based on conditions detected or applicable to the device.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of air cleaning devices have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An electrostatic precipitator electrode pair comprising a first electrostatic precipitator electrode element arranged parallel to a second electrostatic precipitator electrode element, wherein said first electrostatic precipitator electrode element is configured for connection at a first connection location to a first electrical potential and said second electrostatic precipitator electrode element is configured for connection at a second connection location to a second electrical potential and where a difference between said first electrical potential and said second electrical potential is a high voltage sufficient to create an electrostatic field to repel charged particles away from one of said first and second electrostatic precipitator electrode elements and attract said charged particles toward the other one of said electrostatic precipitator electrode elements:

wherein said first connection location is remote and extended substantially from said second connection location;

wherein said first electrostatic precipitator electrode element exhibits a resistivity along a current flow path between said first connection location and a location corresponding to said second connection location at a level sufficient to dissipate spark events;

wherein said first electrostatic precipitator electrode element includes an interruption which extends said current flow path;

wherein said interruption is a first non-conductive segment arranged between said first connection location and a position corresponding to said second connection location;

wherein said first connection location and said second connection location define a medial axis of said first electrostatic precipitator electrode element and said non-conductive segment that transects said medial axis;

wherein said non-conductive segment extends from a first lateral edge of said first electrostatic precipitator electrode element;

further comprising a second non-conductive segment extending from a second lateral edge opposing said first lateral edge wherein said second non-conductive segment transects said medial axis further extending said current flow path; and wherein said first non-conductive segment and said second non-conductive segment establish an S-shaped electrode element.

2. An electrostatic precipitator electrode pair comprising a first electrostatic precipitator electrode element arranged parallel to a second electrostatic precipitator electrode element, wherein said first electrostatic precipitator electrode element is configured for connection at a first connection location to a first electrical potential and said second electrostatic precipitator electrode element is configured for connection at a second connection location to a second electrical potential and where a difference between said first electrical potential and said second electrical potential is a high voltage sufficient to create an electrostatic field to repel charged particles away from one of said first and second electrostatic precipitator electrode elements and attract said charged particles toward the other one of said electrostatic precipitator electrode elements:

wherein said first connection location is remote and extended substantially from said second connection location;

wherein said first electrostatic precipitator electrode element exhibits a resistivity along a current flow path between said first connection location and a location corresponding to said second connection location at a level sufficient to dissipate spark events;

wherein said first electrostatic precipitator electrode element includes an interruption which extends said current flow path;

wherein said first electrostatic precipitator electrode element comprises a static dissipative material;

wherein said static dissipative material is a moldable synthetic polymer; and further comprising a non-conductive segment of at least one of said first and second electrostatic precipitator electrode elements wherein said non-conductive segment transects a medial axis defined by said first connection location and said second connection location wherein said non-conductive segment is defined by treating said static dissipative material to locally increase resistance.

3. An electrostatic precipitator electrode pair comprising a first electrostatic precipitator electrode element arranged parallel to a second electrostatic precipitator electrode element, wherein said first electrostatic precipitator electrode element is configured for connection at a first connection location to a first electrical potential and said second electrostatic precipitator electrode element is configured for connection at a second connection location to a second electrical potential and where a difference between said first electrical potential and said second electrical potential is a high voltage sufficient to create an electrostatic field to repel charged particles away from one of said first and second electrostatic precipitator electrode elements and attract said charged particles toward the other one of said electrostatic precipitator electrode elements:

wherein said first connection location is remote and extended substantially from said second connection location;

wherein said first electrostatic precipitator electrode element exhibits a resistivity along a current flow path between said first connection location and a location corresponding to said second connection location at a level sufficient to dissipate spark events;

wherein said first electrostatic precipitator electrode element includes an interruption which extends said current flow path;

wherein said first electrostatic precipitator electrode element comprises a static dissipative material;

wherein said static dissipative material is a moldable synthetic polymer; and further comprising a non-conductive segment of at least one of said electrostatic precipitator electrode elements, wherein said non-conductive segment transects a medial axis defined by said first connection location and said second connection location wherein said non-conductive segment is defined by absence of material forming said at least one said electrostatic precipitator electrode elements.

4. The electrostatic precipitator electrode pair according to claim 3 further comprising a non-conductive stabilizing element in at least a portion of said non-conductive segment of said at least one of said electrostatic precipitator electrode element.

5. An electrostatic precipitator electrode pair comprising a first electrostatic precipitator electrode element arranged parallel to a second electrostatic precipitator electrode element, wherein said first electrostatic precipitator electrode element is configured for connection at a first connection location to a first electrical potential and said second electrostatic precipitator electrode element is configured for connection at a second connection location to a second electrical potential and where a difference between said first electrical potential and said second electrical potential is a high voltage sufficient to create an electrostatic field to repel charged particles away from one of said first and second electrostatic precipitator electrode elements and attract said charged particles toward the other one of said electrostatic precipitator electrode elements:

wherein said first connection location is remote and extended substantially from said second connection location;

wherein said first electrostatic precipitator electrode element exhibits a resistivity along a current flow path between said first connection location and a location corresponding to said second connection location at a level sufficient to dissipate spark events;

wherein said first electrostatic precipitator electrode element includes an interruption which extends said current flow path;

wherein said first electrostatic precipitator electrode element comprises a static dissipative material;

wherein said static dissipative material is a moldable synthetic polymer; and further comprising a non-conductive segment of at least one of said first and second electrostatic precipitator electrode elements, wherein said non-conductive segment transects a medial axis defined by said first connection location and said second connection location wherein said non-conductive segment is defined by insulating material molded into said at least one of said first and second electrostatic precipitator electrode elements.

6. The electrostatic precipitator electrode pair according to claim 2 wherein said first non-conductive segment establishes a C-shaped electrode element.

7. An electrostatic precipitator electrode pair comprising a first electrostatic precipitator electrode element arranged parallel to a second electrostatic precipitator electrode element, wherein said first electrostatic precipitator electrode element is configured for connection at a first connection location to a first electrical potential and said second electrostatic precipitator electrode element is configured for connection at a second connection location to a second electrical potential and where a difference between said first electrical potential and said second electrical potential is a high voltage sufficient to create an electrostatic field to repel charged particles away from one of said first and second electrostatic precipitator electrode elements and attract said charged particles toward the other one of said electrostatic precipitator electrode elements:

wherein said first connection location is remote and extended substantially from said second connection location;

wherein said first electrostatic precipitator electrode element exhibits a resistivity along a current flow path between said first connection location and a location corresponding to said second connection location at a level sufficient to dissipate spark events;

wherein said first electrostatic precipitator electrode element includes an interruption which extends said current flow path;

wherein said second electrostatic precipitator electrode element is configured to correspond to a configuration of said first electrostatic precipitator electrode element; and wherein at least one of said first and second electrostatic precipitator electrode elements further comprising multiple interleaved non-conductive segments extending in opposing directions to define a switchback current path.

8. The electrostatic precipitator electrode pair according to claim 7 wherein said switchback current path has 2 to 10 switchbacks.

9. The electrostatic precipitator electrode pair according to claim 8 wherein said switchback current path has 10 switchbacks.

10. The electrostatic precipitator electrode pair according to claim 7 wherein said first non-conductive segment establishes a C-shaped electrode element.

11. The electrostatic precipitator electrode pair according to claim 3 wherein said first non-conductive segment establishes a C-shaped electrode element.

* * * * *